Aug. 16, 1966    R. K. WHITEHEAD, SR., ET AL    3,266,750
UNIVERSAL BOBBIN HOLDER
Filed Nov. 1, 1963    10 Sheets-Sheet 2
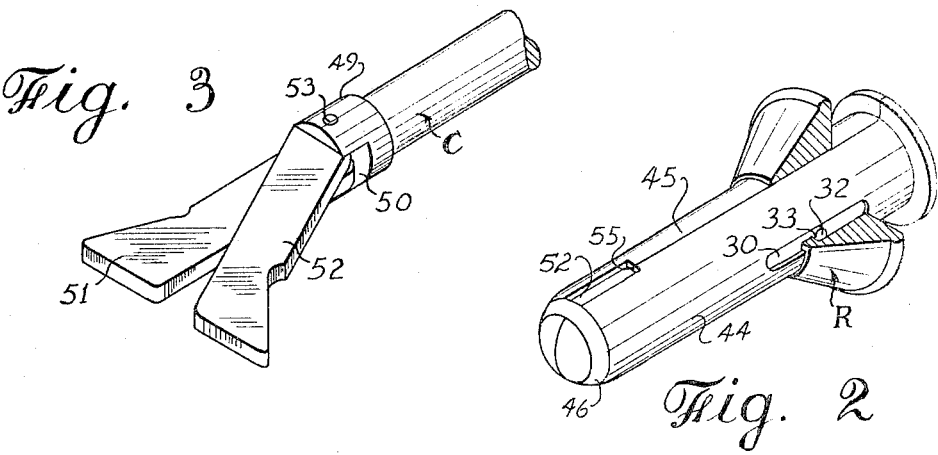
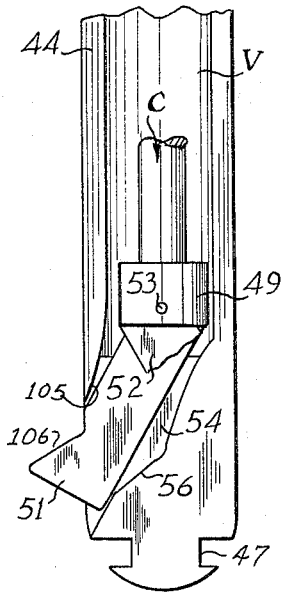
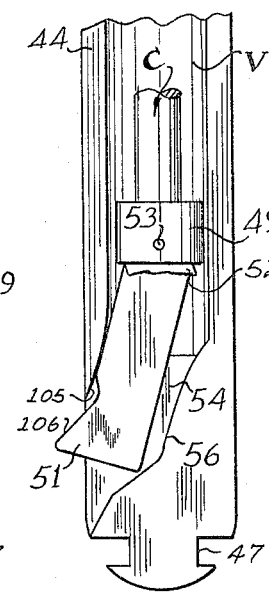
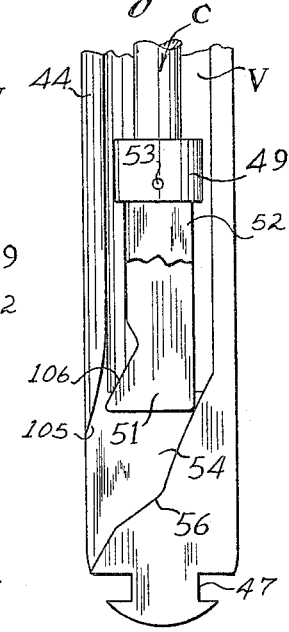
INVENTORS:
RICHARD K. WHITEHEAD, Sr.
RICHARD K. WHITEHEAD, Jr.
BY
Newton, Hopkins & Jones
ATTORNEYS

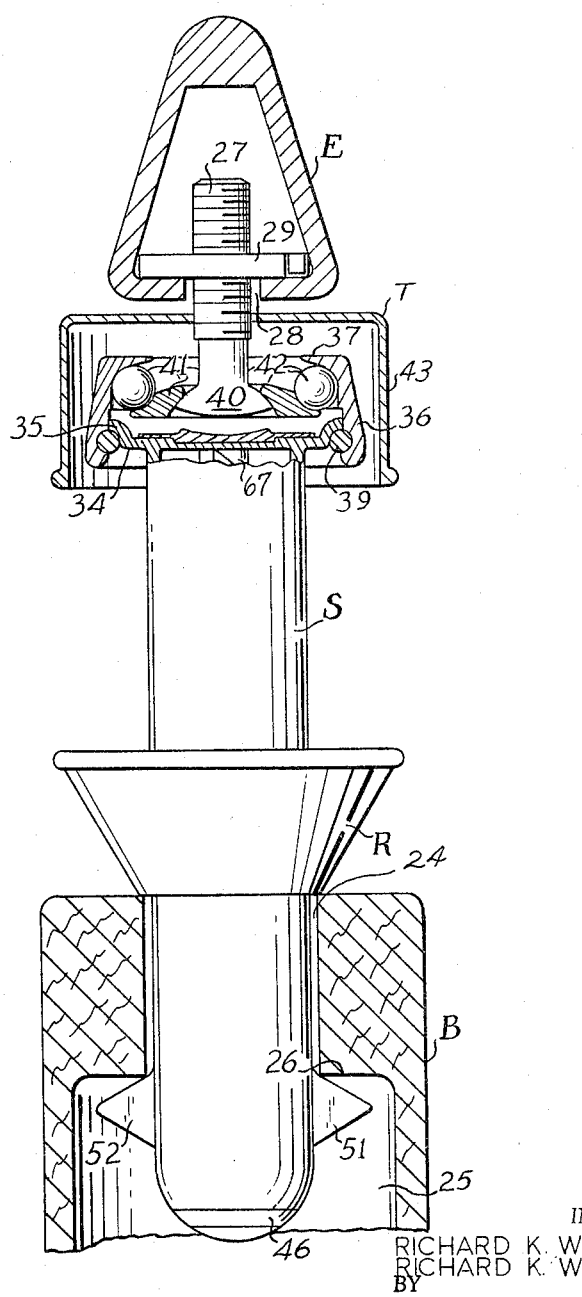

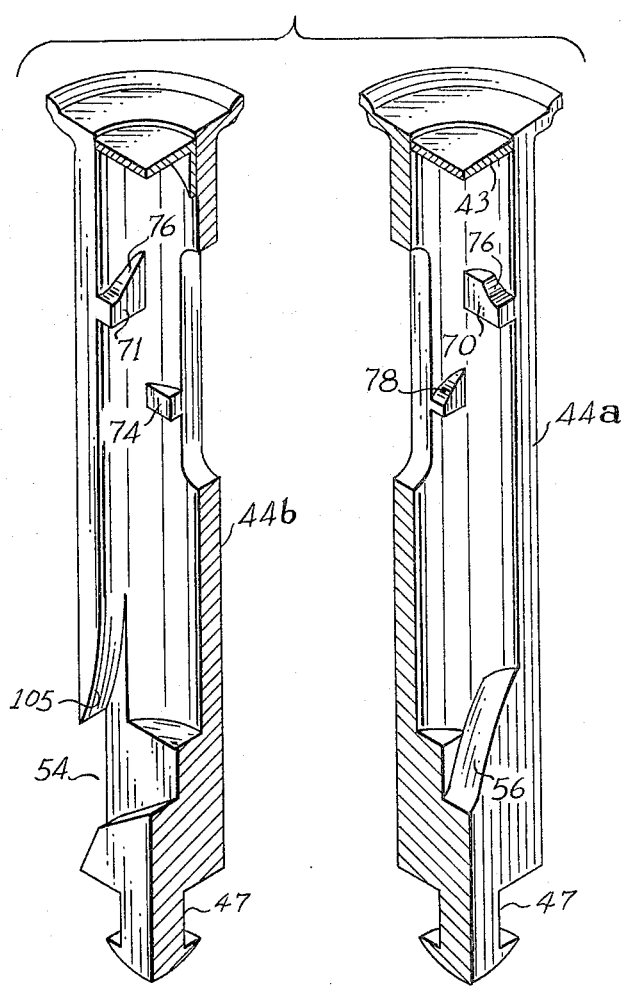

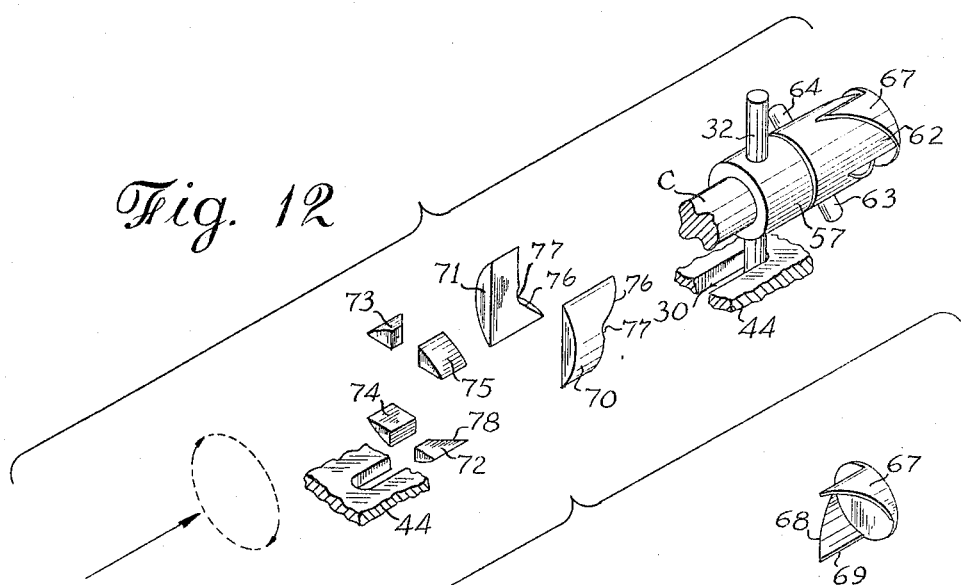
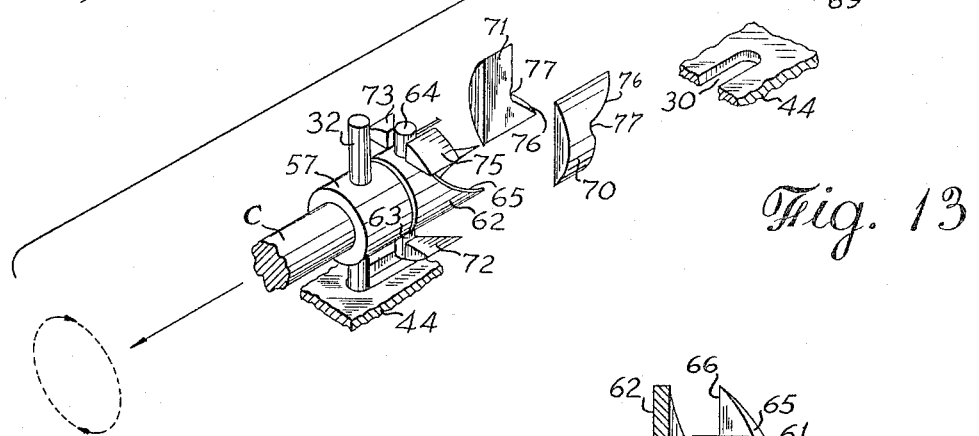
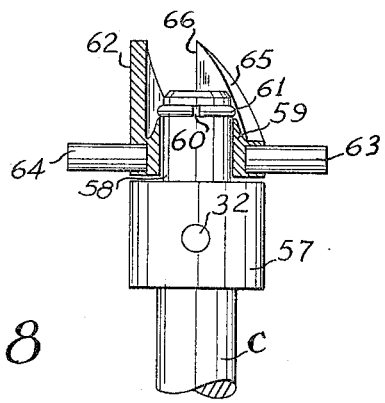

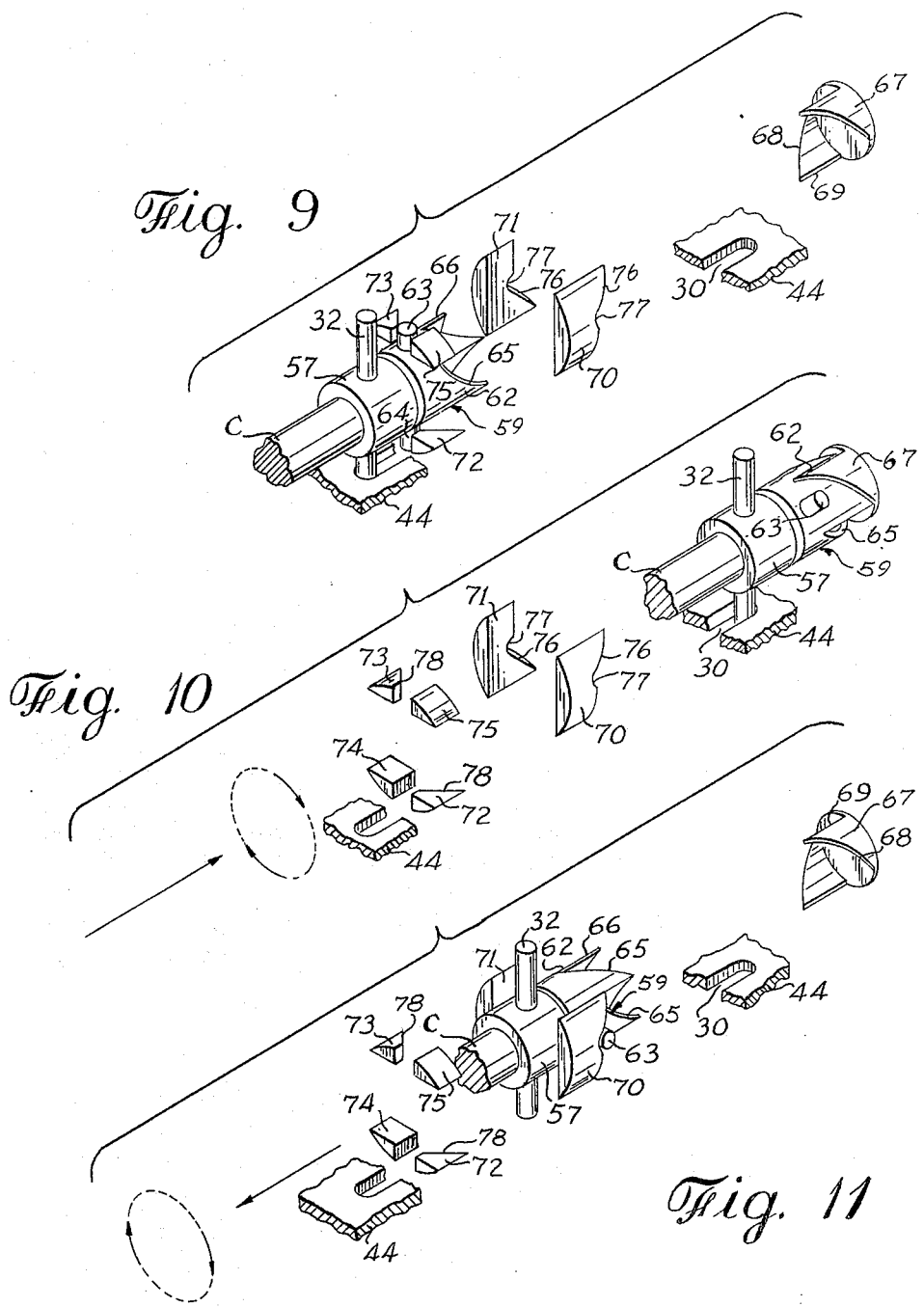

INVENTORS:
RICHARD K. WHITEHEAD Sr.
RICHARD K. WHITEHEAD Jr.
BY
*Newton, Hopkins & Jones*
ATTORNEYS INVENTORS:
RICHARD K. WHITEHEAD Sr.
RICHARD K. WHITEHEAD Jr.
BY
Newton, Hopkins & Jones
ATTORNEYS

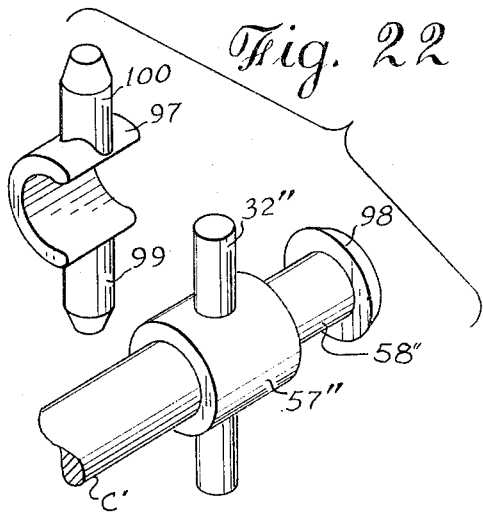
Fig. 22
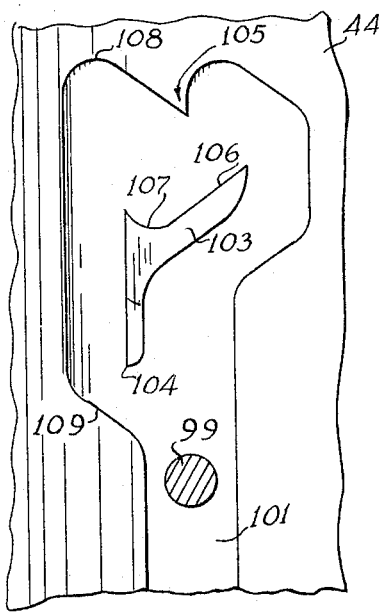
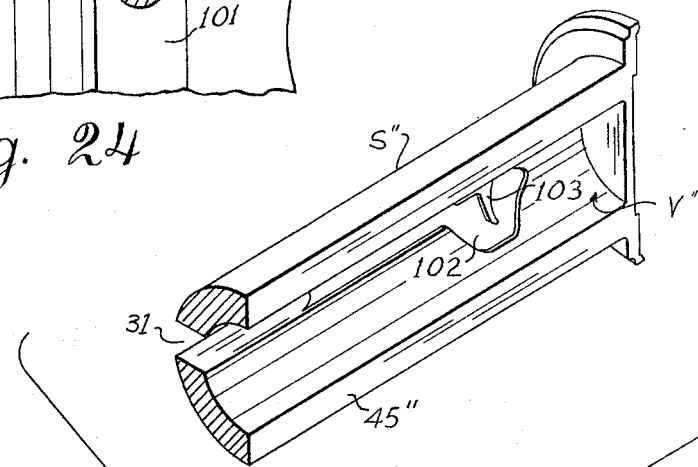
Fig. 24
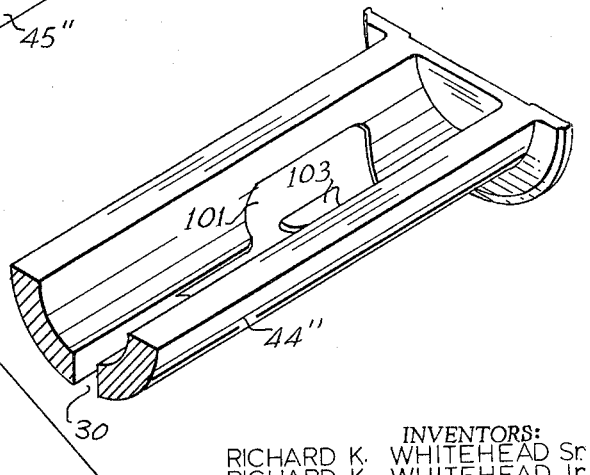
Fig. 23

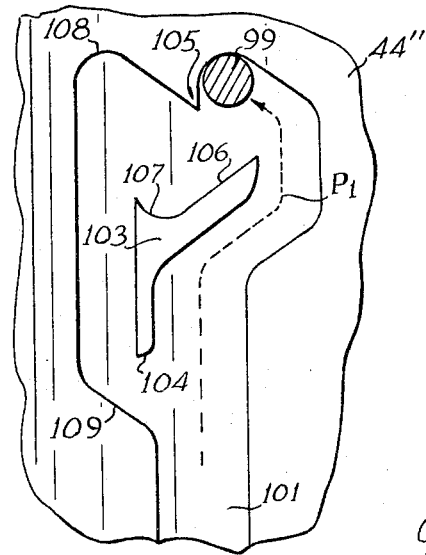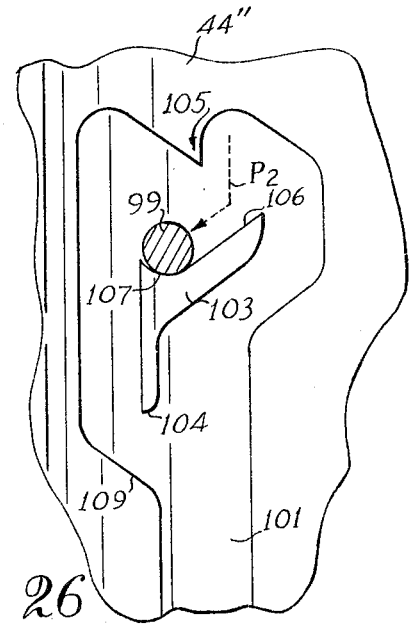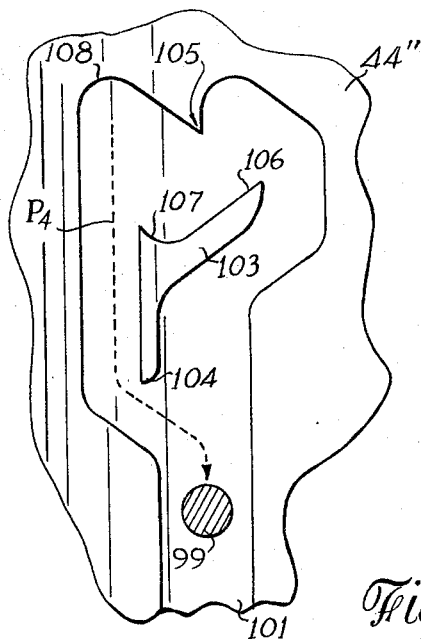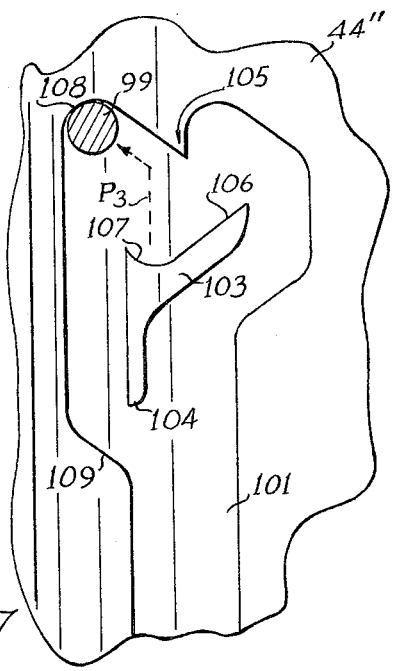

3,266,750
UNIVERSAL BOBBIN HOLDER
Richard K. Whitehead, Sr., 1631 N. Gatewood Road NE., De Kalb County, Ga., and Richard K. Whitehead, Jr., 1365 Monroe Drive NE., Atlanta, Ga.
Filed Nov. 1, 1963, Ser. No. 320,773
26 Claims. (Cl. 242—130.2)

This invention relates to bobbin holders and more particularly, to a suspension type bobbin holder by which a standard type bobbin for thread, sliver, or roving is releasably suspended for free rotation from the creel board or creel rail of a spinning machine or the like.

Bobbins suspended for free rotation from the creel boards or creel rails of spinning or similar machines must be frequently changed since the thread, sliver, or roving on a bobbin is quickly used by the high speed machines which having been developed for the textile industry. As a result, the textile industry has developed a variety of suspension type bobbin holders in an effort to provide for rapid and efficient changing of bobbins.

Most of these previous bobbin holders have characteristically permitted the slidable positioning of a bobbin on the bobbin holder and the slidable removal of a bobbin from the bobbin holder to be accomplished with substantially the same basic motions by the operator of the machine. This is because such a feature avoids the possibility of operator confusion and permits an operator to develop a standardized efficient pattern of motions.

Bobbins used with suspension type bobbin holders usually have a shoulder formed at the upper end of a cylindrical recess and previously suspension type bobbin holders have generally suspended a bobbin of this type by expanding and contracting the lower end of the bobbin holder within the recess and below the shoulder with pawls which move between fixed outwardly extending positions and retracted positions. The pawls extend outwardly when a bobbin is in position on the bobbin holder and are retracted when a bobbin is being positioned on the bobbin holder or removed from the bobbin holder. The shoulder of a bobbin resting on the pawls when the pawls are extended holds the bobbin in position on the bobbin holder and the bobbin is easily positioned on and removed from the bobbin holder when the pawls are retracted.

The difficulty with most of these previous bobbin holders is that the pawls must extend to a fixed extent and must be locked in position when a bobbin is on the bobbin holder. Thus, if the diameter of the recess in a bobbin is not at least as great as the distance between the extending tips of the pawls of the bobbin holder, the pawls of the bobbin holder cannot extend and lock and will retract and release the bobbin because of the weight of the bobbin. Moreover, when an operator attempts to lock the pawls in bobbin holding position in a bobbin having a recess too small to receive the fully extended pawls, the bobbin is frequently damaged or it may become jammed on the bobbin holder. Thus, most previous bobbin holders have generally not been well adapted to holding bobbins of various sizes having recesses of varying diameter. Yet, for maximum utilization of spinning or similar machines, it is frequently necessary that bobbins of various sizes be easily and efficiently positioned on and removed from a single bobbin holder.

This problem with most previous bobbin holders has resulted in the development of universal suspension type bobbin holders capable of holding and releasing bobbins of various sizes. However, even though these previous universal bobbin holders will receive, hold and release bobbins of various sizes, they have not been wholly satisfactory. This is because they have characteristically required a particular motion on the part of the operator when a bobbin is being positioned on a bobbin holder and an entirely different motion on the part of the operator when a bobbin is being removed from the bobbin holder.

Since the changing of bobbins in the textile industry must be accomplished at a highly rapid rate, these different operator motions frequently cause operator error such as the attempted positioning of a bobbin with a releasing motion or the attempted releasing of a bobbin with a positioning motion. If the wrong motion issued in positioning a bobbin on the bobbin holder, the bobbin drops from the bobbin holder, and if the wrong motion is used to release a bobbin, the bobbin is not released, and an additional time wasting attempt to remove the bobbin must be made before the removal of the bobbin is accomplished.

The bobbin holder disclosed herein is a universal bobbin holder in that it will receive, hold and release bobbins varying in size over a relatively wide range and having recesses and shoulders varying in diameter over relatively wide ranges. In addition, the bobbin holder disclosed herein completely overcomes the above described difficulty with previous universal bobbin holders in that the positioning of a bobbin on and the releasing of a bobbin from the bobbin holder are accomplished by the same motion of the bobbin relative to the bobbin holder. The required motion is simply an upward motion of the bobbin relative to the bobbin holder. This motion is easily mastered by the operator of a machine and does not require the operator to remember and master the motion of a bobbin relative to the bobbin holder when the bobbin is to be positioned and an entirely different motion of a bobbin relative to the bobbin holder when the bobbin is to be released. Moreover, the bobbin holder disclosed herein is durable in construction and relatively easy and inexpensive to manufacture.

These improvements in bobbin holders are achieved by a bobbin holder having the customary bullet shaped outer shell which extends into the recess of a bobbin and which is rotatably suspended downward from the creel board or creel rail of a spinning or similar machine, having a central body slidably movable within the outer shell, having pawls which retract into the outer shell as the central body moves upward within the outer shell and which extend outwardly from the outer shell as the central body moves downward within the outer shell, having a sleeve slidably movable along the outer surface of the outer shell when moved by the upper edge of a bobbin as the bobbin is moved for positioning on or releasing from the bobbin holder, and having an operating means for alternately checking the downward motion of the central body and permitting the downward motion of the central body in response to repeated upward motions of the sleeve. The pawls remain retracted into the outer shell when the downward motion of the central body is checked and they extend from the outer shell when the downward motion of the central body is permitted. Thus, the operating means for alternately checking the downward motion of the central body and permitting the downward motion of the central body in response to the motion of the sleeve serves alternately to hold the pawls in retracted position and to permit the pawls to extend as the sleeve is repeatedly moved by a bobbin. The pawls extend until they are fully extended or until they engage the walls of the recess in a bobbin, and regardless of the extent to which extended, the pawls support a bobbin having a recess permitting them to extend and a shoulder above the pawls when extended.

With the operating means checking the downward motion of the central body, a bobbin may be positioned on the bobbin holder disclosed herein by simply sliding the bobbin upward along the outer shell so as to move the sleeve upward. This upward motion of the sleeve causes the operating means to permit the central body to move downward within the outer shell. As a result, the pawls extend to the extent permitted by the size of the recess in the bobbin and hold the bobbin in position on the bobbin holder.

When it is desired to subsequently release the bobbin from the bobbin holder, it is simply necessary to once again move the bobbin upward along the outer shell of the bobbin holder so as to move the sleeve upward along the outer shell of the bobbin holder. This upward motion of the sleeve causes the alternate response of the operating means so that the downward motion of the central body is once again checked and the pawls are retracted into the outer shell of the bobbin holder for easy removal of the bobbin and positioning of the next bobbin. The upward motion of the sleeve as the next bobbin is positioned on the bobbin holder, will once again cause the operating means to release the central body so as to permit the pawls to extend and hold the new bobbin in position on the bobbin holder.

The positioning of a bobbin on and the removal of a bobbin from the bobbin holder disclosed herein is accomplished by the same upward motion of the bobbin relative to the bobbin holder and this upward motion of the bobbin relative to the bobbin holder alternately causes the bobbin to be firmly positioned on the bobbin holder or quickly released from the bobbin holder. Thus, the bobbin holder disclosed herein permits bobbins to be positioned on or released from it with a single efficient motion by the operator and avoids all possibility of operator confusion and of time lost while several attempts are made to achieve the correct motion for the releasing of a bobbin from or the positioning of a bobbin on the bobbin holder.

These and other features and advantages of the invention will be more clearly understood from the following detailed description and the accompanying drawings in which like characters of reference designate corresponding parts in all figures and in which:

FIG. 1 is a side elevation view partially cut away, of the bobbin holder suspended from a creel rail and having a bobbin positioned on its lower end.

FIG. 2 is a perspective view of the bobbin holder with the suspension assembly removed.

FIG. 3 is a perspective view of the lower end of the central body, the right pawl, and the left pawl of the bobbin holder.

FIG. 4 is an elevation view of the inside of the lower end of the right half of the outer shell of the bobbin holder and shows the position of the central body and the right pawl when the right pawl is extended to a bobbin holding position.

FIG. 5 is an elevation view of the inside of the lower end of the right half of the outer shell of the bobbin holder and shows the position of the central body and of the right pawl as the right pawl is being extended or retracted by the central body.

FIG. 6 is an elevation view of the lower end of the right half of the outer shell of the bobbin holder and shows the position of the central body and of the right pawl when the right pawl is retracted into the outer shell.

FIG. 7 is an exploded view of the right half of the outer shell of the bobbin holder and shows the check blocks, the adjusting blocks, and the channel blocks of the operating means.

FIG. 8 is an elevation view, partially in section, of the upper end of the central body of the bobbin holder.

FIG. 9 is a fragmentary view of the central body and of the operating means of the bobbin holder and shows the positions of the positioning rods when the central body is released and the pawls are extended from the outer shell.

FIG. 10 is a fragmentary view of the central body and of the operating means of the bobbin holder and shows the positions of the positioning rods after primary holding rotation of the hub by the upper positioning teeth in response to upward motion of the central body as a bobbin is being removed from the bobbin holder.

FIG. 11 is a fragmentary view of the central body and of the operating means of the bobbin holder and shows the positions of the positioning rods after secondary holding rotation of the hub by the check blocks and with the pawls retracted into the outer shell for releasing a bobbin from or positioning a bobbin on the bobbin holder.

FIG. 12 is a fragmentary view of the central body and of the operating means of the bobbin holder and shows the positions of the positioning rods after primary releasing rotation of the hub by the upper positioning teeth in response to upward motion of the central body as a bobbin is being positioned on the bobbin holder.

FIG. 13 is a fragmentary view of the central body and of the operating means of the bobbin holder and shows the positions of the positioning rods after secondary releasing rotation of the hub by the adjusting blocks and with the central body released so as to hold a bobbin on the bobbin holder.

FIG. 22 is an exploded view of the upper end of the central body of a third embodiment of the bobbin holder.

FIG. 23 is an exploded view of the upper portions of the right shell and the left shell of the third embodiment of the bobbin holder.

FIG. 24 is a fragmentary elevation view of the inside of the right shell of the third embodiment of the bobbin holder and shows the right camming channel in elevation and the right cam rod in cross section.

FIG. 25 is a fragmentary elevation view of the inside of the right shell of the third embodiment of the bobbin holder and shows the primary holding motion of the right cam rod in response to upward motion of the central body as a bobbin is moved upward to be released from the bobbin holder.

FIG. 26 is a fragmentary elevation view of the inside of the right shell of the third embodiment of the bobbin holder and shows the secondary holding motion of the right cam rod in response to downward motion of the central body as a bobbin is removed from the bobbin holder.

FIG. 27 is a fragmentary elevation view of the inside of the right shell of the third embodiment of the bobbin holder and shows the primary releasing motion of the right cam rod in response to upward motion of the central body as a bobbin is positioned on the bobbin holder.

FIG. 28 is a fragmentary elevation view of the inside of the right shell of the third embodiment of the bobbin holder and shows the secondary releasing motion of the right cam rod as the central body moves downward to extend the pawls for holding a bobbin on the bobbin holder.

Figure 14:
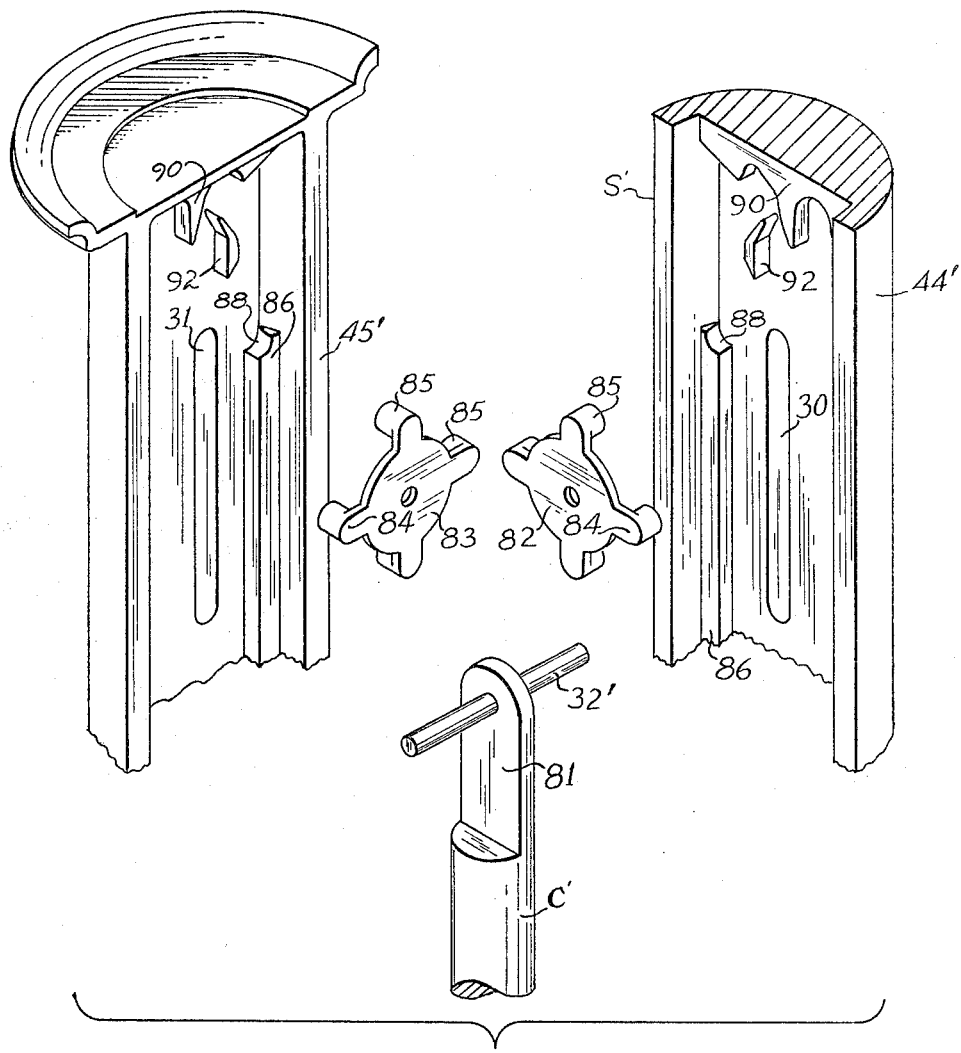
FIG. 14 is an exploded view of a second embodiment of the bobbin holder and shows the upper end of the central body, the positioning wheels, the cams, and the vertical ribs of the operating means.
Figure 15:
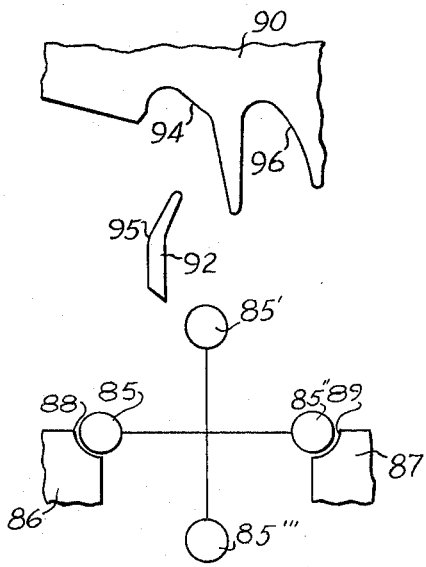
FIG. 15 is a schematic presentation of the operating means of the second embodiment of the bobbin holder and shows the position of a positioning wheel when the central body is held in upward position so as to retract the pawls for releasing or positioning a bobbin.

These figures and the following detailed description disclose a preferred specific embodiment of the invention but the invention is not limited to the details disclosed herein since it may be embodied on other equivalent forms.

The bobbin holder disclosed herein is best understood as comprising a tubular outer shell S suspended by a suspension assembly T from a creel rail E and having a sleeve R slidably movable along its length. The lower end of the outer shell S is insertable through a hole 24 in the upper end of a bobbin B so as to position the lower end of the outer shell S within a cavity 25 in the bobbin B and beneath a shoulder 26 formed in the bobbin B where the hole 24 is continuous with the cavity 25. The suspension assembly T is suspended from the creel rail E by a bolt 27 which extends upwardly from the suspension assembly T through a hole 28 in the creel rail E and which is threadably engaged at its upper end by a locking plate 29 positioned within the creel rail E.

The outer shell S has a right slot 30 extending through it for a portion of its length and left slot 31 extending through it for a portion of its length on the opposite side from the right slot 30. A shaft 32 extends through the right slot 30, through a central body C slidably positioned within the outer shell S, and through the left slot 31 and the extending ends of the shaft 32 are fixedly positioned within recesses 33 in the sleeve R. Thus, if the sleeve R is slidably moved along the length of the outer shell S, the shaft 32 and the central body C are moved as the sleeve R moves.

The suspension assembly T holds the upper end of the outer shell S which has a flange 34 extending outwardly and a lip 35 continuous with the outer edge of the flange 34. The lip 35 is positioned within a bearing cylinder 36 having an inwardly extending flange 37 at its upper end and a ring 39 fixedly positioned in its inner surface at its lower end. The outer shell S is held within the bearing cylinder 36 by resting the lip 35 upon the ring 39. A button 40 is at the lower end of the bolt 27 and the bearing cylinder 36 and the outer shell S are supported within the suspension assembly T by a disc 41 concentric with and resting upon the button 40 and by a plurality of bearings 42 positioned between the disc 41 and the inwardly extending flange 37 of the bearing cylinder 36. A dust cover 43 completes the suspension assembly T and insures that dust does not enter the suspension assembly T and prevent the free rotation of the bearings 42 between the inwardly extending flange 37 and the disc 41. From the foregoing, it will be understood that the suspension assembly T serves to suspend the outer shell S, the sleeve R, and the bobbin B from a creel rail E so as to permit the free rotation of the outer shell S about its centerline.

The outer shell S upon which a bobbin B is positioned comprises a right half 44 and left half 45 held together to form the outer shell S by the positioning of the lip 35 within the bearing cylinder 36 and by a ring 46 of resilient material placed within a channel 47 at the lower end of the outer shell S. The right half 44 and the left half 45 of the outer shell S are substantially identical mirror images of each other and together the halves 44 and 45 of the outer shell S define a cavity V within which the central body C is slidably movable in response to the motion of the sleeve R.

A plug 49 having a slot 50 in its lower surface is fixedly attached to the lower end of the central body C within the cavity V. One end of a right pawl 51 and one end of a left pawl 52 are inserted into the slot 50 and pivotally attached to the central body C by extending a retaining pin 53 through the plug 49, the right pawl 51, and the left pawl 52. Thus, as the central body C slidably moves within the cavity V in response to the motion of the sleeve R, the pawls 51 and 52 move upward and downward relative to the suspension assembly T. The right half 44 of the outer shell S has a right pawl channel 54 continuous with that half of the cavity V formed by it, and the left half 45 of the outer shell S has a left pawl channel 55 continuous with that portion of the cavity V formed by it. The pawl channels 54 and 55 extend in opposite directions when the halves 44 and 45 of the outer shell S are placed together to form the shell S. The lower end of the right pawl 51 is in the right pawl channel 54 and the lower end of the left pawl 52 is in the left pawl channel 55.

The lowermost surfaces 56 of the pawl channels 54 and 55 are inclined outwardly so as to move the pawls 51 and 52 progressively outward as the pawls 51 and 52 move downward in the pawl channels 54 and 55 with the extent to which the pawls 51 and 52 extend depending upon the extent to which the central body C moves downward within the cavity V. The uppermost surfaces 105 of the pawl channels 54 and 55 permit this outward motion of the pawls 51 and 52 and serve to force the pawls 51 and 52 downward when the central body C moves upward within the cavity V.

The weight of the bobbin B or downward force exerted on the bobbin B by the operator of a machine on the holding edges 106 of the pawls 51 and 52 forces the pawls 51 and 52 inward and downward against the lowermost surfaces 56 of the pawl channels 54 and 55. Thus, there is no tendency for the pawls 51 and 52 to be forced into the outer shell S by the weight of a bobbin B or even by the downward force exerted on the bobbin B by the operator of a machine. This is because it requires inward and upward motion of the pawls 51 and 52 for the pawls 51 and 52 to be retracted and this holding action of the pawls 51 and 52 is obtained regardless of the extent to which the pawls 51 and 52 are extended. Thus, when the central body C is free to move downward so as to permit the pawls 51 and 52 to extend outwardly from the outer shell S, a bobbin B having a shoulder 26 engaging the pawls 51 and 52 will be firmly held by the bobbin holder.

The diameter of the sleeve R is greater than the diameter of the hole 24 in a bobbin B and the sleeve R is engaged and moved upward along the outer shell S by a bobbin B as the bobbin B is moved upward along the length of the outer shell S. When the sleeve R is not being held in an upward position by a bobbin B or other means, the sleeve R has sufficient weight to slide downward along the outer shell S carrying the central body C downward with it so as to extend the pawls 51 and 52 from the outer shell S. It is this tendency of the sleeve R to extend the pawls 51 and 52 as it follows a bobbin B downward along the outer shell S which causes the pawls 51 and 52 to extend within the recess 25 of the bobbin B and hold the bobbin B on the bobbin holder, and it is the retracting of the pawls 51 and 52 by upward motion of the sleeve R so as to retract the pawls 51 and 52 which permits a bobbin B to be easily positioned on or removed from the bobbin holder.

The bobbin holder has an operating means responsive to the upward motion of the sleeve R and which alternately holds the central body C and the sleeve R in an upward position at which the pawls 51 and 52 are retracted and releases the central body C and the sleeve R for downward motion so as to extend the pawls 51 and 52. It will now be seen that with the pawls 51 and 52 retracted by the operating means holding the central body C in an upward position, a bobbin B may be easily positioned on the bobbin holder with an upward motion along the outer shell S. As the bobbin B moves upward along the outer shell S, it engages the sleeve R and forces the sleeve R upward. This upward motion of the sleeve R causes the alternate response of the operating means so as to release the sleeve R and the central body C for downward motions. This causes the pawls 51 and 52 to extend to the extent permitted by the size of the recess 25 in the bobbin B and causes the bobbin B to be held by the bobbin holder regardless of the extent to which the pawls 51 and 52 are extended. When it is subsequently desired to remove the bobbin B from the bobbin holder, the bobbin B is once again moved upward toward the suspension assembly T. This causes the sleeve R to move upward thereby causing the alternate response to the operating means which holds the central body C and the sleeve R in an upward position at which the pawls 51 and 52 are retracted into the outer shell. The result is that the bobbin B is easily removed from the bobbin holder and when another bobbin B is placed on the bobbin holder with upward motion sufficient to raise the sleeve R and release the central body C and the sleeve R, the bobbin holder will hold the new bobbin B in position.

The upward motion of a bobbin B relative to the bobbin holder as it is positioned on the bobbin holder and as it is released from the bobbin holder is identical, and in each case the bobbin holder engages the sleeve R and carries the sleeve R and the central body upward until the upward motion of the central body C is checked by the operating means. This checking of the upward motion of the central body C by the operating means causes the outer shell S to be forced upward against the suspension assembly T each time the bobbin B is positioned on or removed from the bobbin holder. A thrust plate 43 is positioned between the closed upper end of the outer shell S and the button 40 to absorb the repeated shock of the outer shell S being forced upward within the suspension assembly T.

The operating means of the bobbin holder is best shown in FIGS. 8 through 13. An upper plug 57 is integral with the upper end of the central body C and a hub shaft 58 extends upwardly from the upper plug 57. The centerline of the upper plug 57 and of the hub shaft 58 coincide with the centerline of the central body C, and a hub 59 is rotatably mounted on the hub shaft 58 by forming a groove 60 in the hub shaft 58 above the hub 59 and inserting a retaining ring 61. It is through the upper plug 57 that the shaft 32 extends from the right slot 30 to the left slot 31 so as to obtain upward motion of the central body C in response to upward motion of the sleeve R.

The hub 59 is extended upwardly within the cavity V into a plurality of vertically extending ratchet teeth 62. A first rod 63 and a second rod 64 extend in opposite directions from the hub 59 below the ratchet teeth 62. The centerline of the first rod 63 coincides with the centerline of the second rod 64 and is perpendicular to and intersects the centerline of the hub shaft 58. The result of this arrangement is a hub 59 freely rotatable about the hub shaft 58 at the upper end of the central body C and having ratchet teeth 62 extending upwardly and rods 63 and 64 extending radially.

In the specific embodiment of the invention shown in FIGS. 8 through 13 there are four ratchet teeth 62 equally distributed about and extending upwardly from the circumference of the hub 59 with each ratchet tooth 62 having a sloping edge 65 and a vertical edge 66.

Extending downwardly within the cavity V are two positioning teeth 67. The positioning teeth 67 are identical to each other and to the ratchet teeth 62 with each having a sloping edge 68 which corresponds to the sloping edges 65 of the plurality of ratchet teeth 62 and a vertical edge 69 which corresponds to the vertical edges 66 of the plurality of ratchet teeth 62. The positioning teeth 67 are positioned so that they engage alternate ratchet teeth 62 when the central body C is moved upward within the cavity V. As the positioning teeth 67 and the ratchet teeth 62 engage each other, the sloping edges 68 of the positioning teeth 67 and the corresponding sloping edges 65 of the ratchet teeth 62 cause the hub 59 to rotate until the sloping edges 65 and 68 are contiguous along their entire lengths. Thus, the positioning teeth 67 serve to fix the position of the hub 59 each time the hub 59 is moved upward to the extent necessary for the ratchet teeth 62 to engage the positioning teeth 67. The particular position of the hub 59 into which the hub 59 is rotated by the positioning teeth 67 depends upon which pair of ratchet teeth 62 the positioning teeth 67 engage. This is best understood when the operation of this embodiment of the bobbin holder is described below.

Fixedly positioned within the cavity V on opposite sides of the cavity V are a first check block 70 and a second check block 71. The check blocks 70 and 71 are sufficiently small so as not to impede the motion of the central body C, the upper plug 57 or the hub 59 and are sufficiently large to engage the extending ends of the rods 63 and 64 if the hub 59 is rotatably positioned on the hub shaft 58 so that the rods 63 and 64 extend toward the check blocks 70 and 71. Moreover, since the check blocks 70 and 71 are between the slots 30 and 31, the check blocks 70 and 71 do not interfere with the motion of the shaft 32 within the channels 30 and 31.

Below the check blocks 70 and 71 are a first adjusting block 72, a second adjusting block 73, a first channel block 74 and a second channel block 75. The first adjusting block 72 and the first channel block 74 are fixedly positioned within the cavity V on opposite sides of the right slot 30. Similarly, the second adjusting block 73 and the second channel block 75 are fixedly positioned within the cavity V on opposite sides of the left slot 31. The result of this arrangement is that the adjusting blocks 72 and 73 and the channel blocks 74 and 75 do not interfere with the motion of the shaft 32 within the right slot 30 and the left slot 31. Moreover, similar to the check blocks 70 and 71, the adjusting blocks 72 and 73 and the channel blocks 74 and 75 are sufficiently small to not interfere with the motion of the central body C, the upper plug 57 or the hub 59 and are sufficiently large to engage the rods 63 and 64 when the rods 63 and 64 extend toward them. As with the ratchet teeth 62 and the positioning teeth 67, the detailed construction and positioning of the check blocks 70 and 71, the adjusting blocks 72 and 73, and the channel blocks 74 and 75 are best understood when the operation of this embodiment of the bobbin holder is described.

The operation of this embodiment of the bobbin holder is best understood by first considering the central body C as being free to move downward within the cavity V so as to extend the pawls 50 and 51 outwardly. The arrangement of the check blocks 70 and 71, the adjusting blocks 72 and 73, and the channel blocks 74 and 75 when this motion of the central body C is permitted is shown in FIG. 9. Referring to FIG. 9, it will be seen that the adjusting blocks 72 and 73 and the channel blocks 74 and 75 are positioned so that the first rod 63 passes between the second adjusting block 73 and the second channel block 75 and the second rod 64 passes between the first adjusting block 72 and the first channel block 74. As indicated above, the check blocks 70 and 71 are positioned so that when the rods 63 and 64 are oriented in this manner, the rods 63 and 64 do not engage the check blocks 70 and 71. Thus, with the hub 59 oriented as described above, the central body C is free to move within the cavity V and will move downward with the sleeve R to extend the pawls 51 and 52 outwardly into the cavity 25 of a bobbin B to hold the bobbin B on the bobbin holder.

When it is desired to remove the bobbin B from the bobbin holder, the sleeve R is moved upwardly along the outer shell S by the upper edge of the bobbin B. The positioning teeth 67 are positioned so that as the central body C moves upward with the rods 63 and 64 in the positions described above, the positioning teeth 67 will engage a pair of ratchet teeth 62 on opposite sides of the hub 59 and rotate these ratchet teeth 62 and the hub 59 in a clockwise direction as viewed in FIG. 10 as the positioning teeth 67 and ratchet 62 are forced into an interlocking position by the upward motion of the central body C. The arrangement of the positioning teeth 67 and of the ratchet teeth 62 is such that the hub is rotated approximately seventy degrees into the position shown in FIG. 10, and each time a bobbin B is moved upward along the outer shell S to be released from the bobbin holder, this rotation of the hub 59 and the rods 63 and 64 occurs.

After this upward motion of the central body C as a result of upward motion of a bobbin B along the outer shell S of the bobbin holder, the bobbin B is moved downward along the outer shell S, and as a result the sleeve R and the central body C start to move downward because of the weight of the sleeve R and of the central body C. The check blocks 70 and 71 are positioned in the cavity V so that the above described rotation of the rods 63 and 64 causes the rods 63 and 64 to extend toward the check blocks 70 and 71. Thus, as the central body C starts to move downward within the cavity V, the first rod 63 strikes the first check block 70 and the second rod 64 strikes the second check block 71. The portions of the check blocks 70 and 71 engaged by the rods 63 and 64 when the rods 63 and 64 are in this position are formed as camming surfaces 76 which slope downward into holding recesses 77.

These camming surfaces 76 cause the rods 63 and 64 to slide downward into the holding recesses 77, with additional clockwise rotation of approximately twenty degrees as shown in FIG. 11. Once positioned within the holding recesses 77 of the check blocks 70 and 71, the rods 63 and 64 prevent further downward movement of the central body C and hold the central body C at a position in which the pawls 51 and 52 are substantially retracted into the outer shell S. With the rods 63 and 64 positioned in the holding recesses 77 of the check blocks 70 and 71, the bobbin B may be easily removed from the bobbin holder and a new bobbin B may be easily placed upon the bobbin holder.

As a new bobbin B is placed upon the bobbin holder its upward motion along the outer shell S of the bobbin holder causes its upper edge to engage the sleeve R so as to move the central body C and the hub 59 upward toward the positioning teeth 67. Since the hub 59 has been rotated by the camming surfaces 67 of the check blocks 70 and 71, the positioning teeth 67 and the ratchet teeth 62 will once again be rotationally displaced with respect to each other. As a result, the positioning teeth 67 cause a clockwise rotation of the hub 59 and the rods 63 and 64 equal to their initial rotation. The result is that the rods 63 and 64 have been rotated approximately one hundred and sixty degrees in a counterclockwise direction from their initial position prior to removal of the first bobbin B, and in this position, the rods 63 and 64 do not engage the check blocks 70 and 71 when the new bobbin B is released, and the sleeve R and the central body C move downward. As the central body C moves downward after the above described primary releasing rotation of the rods 63 and 64 by the action of the positioning teeth 67, the rods 63 and 64 engage downwardly sloped adjusting surfaces 78 of the adjusting blocks 72 and 73. This causes further clockwise rotation of the rods 63 and 64 into positions in which the first rod 63 now passes between the first adjusting block 72 and the first channel block 74 and the second rod 64 now passes between the second adjusting block 73 and the second channel block 75. Thus, the removal of a bobbin B and the positioning of a new bobbin B on the bobbin holder causes approximately one hundred and eighty degrees rotation of the rods 63 and 64 from their initial positions prior to the removal of the first bobbin B.

From the foregoing, it will be understood that the rods 63 and 64 are rotated approximately ninety degrees each time the central body C is moved upward within the cavity V and released to move downward within the cavity V and that the ninety degrees rotation alternately places the rods 63 and 64 in the holding recesses 77 of the check blocks 70 and 71 and in position to pass between the adjusting blocks 72 and 73 and the channel blocks 74 and 75. Moreover, it will also be understood that the primary releasing rotation or the primary holding rotation of the rods 63 and 64 is provided by the positioning teeth 67, that secondary holding rotation of the rods 63 and 64 is provided by the camming surfaces 76 of the check blocks 70 and 71, and that secondary releasing rotation of the rods 63 and 64 is provided by the adjusting surfaces 78 of the adjusting blocks 72 and 73. It is the secondary rotations of the rods 63 and 64 by the camming surfaces 76 and the adjusting surfaces 78 which permit the positioning teeth 67 to repeatedly rotate the hub 59 in a clockwise direction since without secondary rotation, the positioning teeth 67 and the ratchet teeth 62 would simply repeatedly interlock in exactly the same position.

Although the position of the sleeve R along the outer shell S when engaged by an upwardly moving bobbin B will vary depending upon the position of the central body C, the motion of the bobbin B with respect to the outer shell S of the bobbin holder is identical for both positioning a bobbin B on the bobbin holder and for removing a bobbin B from the bobbin holder. This is because both the positioning of a bobbin B on the bobbin holder and the removal of a bobbin B from the bobbin holder require that the sleeve R be moved upward until the positioning teeth 67 are interlocked with the ratchet teeth 62. Thus, in using this embodiment of the bobbin holder, the bobbin B is always forced upward along the outer shell S of the bobbin holder until its upward motion is stopped by the sleeve R. It is immaterial to the person positioning a bobbin B on or removing a bobbin B from the bobbin holder when the sleeve R is engaged by the upper end of a bobbin B.

*Second embodiment*

A second embodiment of the bobbin holder disclosed herein is shown in FIGS. 14 through 18. In this embodiment the central body C' is continuous at its upper end with a tab 81 through which the shaft 32' is inserted. A first wheel 82 is rotatably positioned on the shaft 32' between the tab 81 and the inner surface of the right half 44' of the outer shell S' and a second wheel 83 is rotatably positioned on the shaft 32' between the tab 81 and the inner surface of the left half 45' of the outer shell S'. The wheels 82 and 83 each have four arms 84 extending radially from and equidistantly spaced around the circumference of the wheels 82 and 83. Each of the arms 84 of the wheels 82 and 83 has a lug at its extending end. The lugs 85 extend outwardly of the tab 81 along centerlines substantially parallel to the centerline of the shaft 32'. The shaft 32' extends through the slot 32 in the right half 44' and the slot 31 in the left half 45' to engage the sleeve R as in the first embodiment, thus causing the central body C' to move as the sleeve R moves.

A first vertical rib 86 and a second vertical rib 87 are positioned within each of the halves 44' and 45' of the shell S' on opposite sides of the channels 30 and 31, and each half 44' and 45' of the shell S' has an upward cam member 90 at its upper end and a lower cam member 92 fixedly mounted within it below the upper cam member 90. The first wheel 82 cooperates with the upper cam member 90, the lower cam member 92, the first vertical rib 86, and the second vertical rib 87 of the right half 44' of the outer shell S' to control the motion of the central body C' in the same manner as the second wheel 83 cooperates with the upper cam member 90, the lower cam member 92, the first vertical rib 86, and the second vertical rib 87 of the left half 45' of the outer shell S'. Accordingly, only the right half 44' of the outer shell S' and the first wheel 82 will be considered in the description of the operation of this embodiment of the bobbin holder below. When the operation of this embodiment of the bobbin holder is understood, the detailed construction of the upper cam members 90, the lower cam members 92, the first vertical ribs 86 and the second vertical ribs 87 in both the right half 44' and the left 45' of the outer shell S' will be understood.

The operation of this embodiment of the bobbin holder is best understood by considering the central body C' as being held in an upward position which causes the pawls 51 and 52 to be retracted into the outer shell S' for the removal of a used bobbin B and the positioning of a new bobbin B on the bobbin holder. It will be seen in FIG. 15 that this upward positioning of the central body C' is accomplished in this embodiment of the bobbin holder by providing the first vertical rib 86 with a circular recess 88 and the second vertical rib 87 with a recess 89 in which lugs 85 on opposite sides of the first wheel 82 will position themselves when a diameter of the first wheel 82 extending between these lugs 85 is substantially perpendicular to the centerline of the outer shell S'. With the lugs 85 seated in the recesses 88 and 89, the central body C' cannot move downward and the pawls 51 and 52 will remain retracted into the outer shell S' until the sleeve R is moved upward along the outer shell S' by a new bobbin B.

Figure 16:
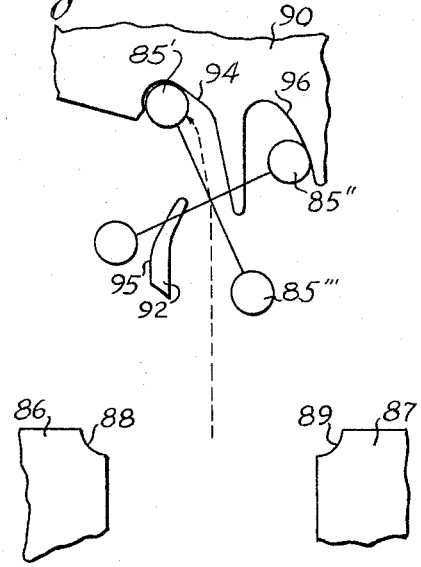
FIG. 16 is a schematic presentation of the operating means of the second embodiment of the bobbin holder and shows the position of a positioning wheel after primary releasing rotation in response to upward motion of the central body as a bobbin is positioned on the bobbin holder.
Figure 18:
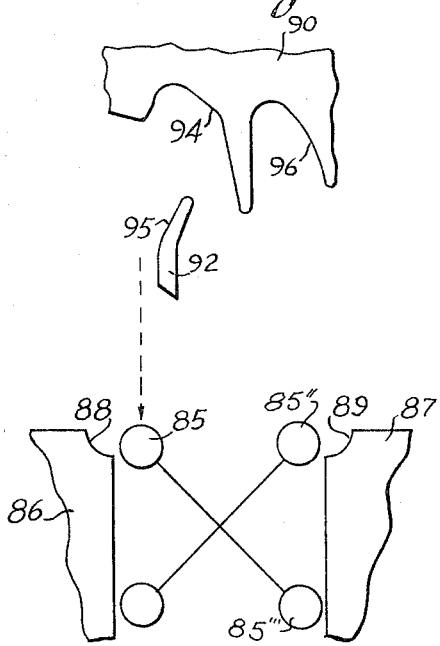
FIG. 18 is a schematic presentation of the operating means of the second embodiment of the bobbin holder and shows the position of a positioning wheel when the central body is released to move downward and hold a bobbin in position on the bobbin holder.
Figure 19:
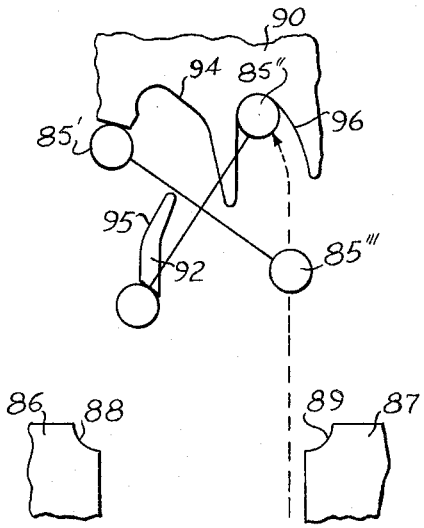
FIG. 19 is a schematic presentation of the operating means of the second embodiment of the bobbin holder and shows the position of a positioning wheel after primary holding rotation in response to the upward motion of the central body as a bobbin is moved upward for release from the bobbin holder.

When sleeve R is moved upward along the outer shell S' by a new bobbin B, the upward motion of the sleeve R carries the central body C' and the wheel 82 upward. As the wheel 82 moves upward, the uppermost lug 85' engages the primary releasing cam surface 94 of the upper cam member 90. As shown in FIG. 16, this cam surface 94 causes a counterclockwise rotation of the wheel 82 as viewed in FIG. 16 and checks the upward motion of the first wheel 82 and the central body C' after this rotation has occurred. Thus, as with the previously described embodiment of the bobbin holder, upward motion of the sleeve R by a bobbin B is limited by the operating means.

Figure 17:
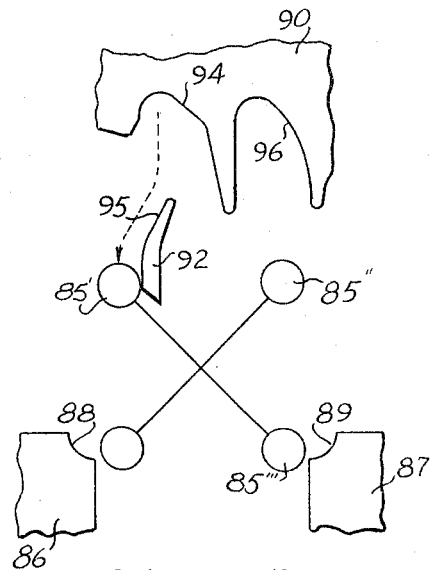
FIG. 17 is a schematic presentation of the operating means of the second embodiment of the bobbin holder and shows the position of a positioning wheel after secondary releasing rotation.

When the bobbin B is subsequently released after maximum upward motion of the bobbin B along the outer shell S' of the bobbin holder, the bobbin B, the sleeve R and the central body C' move downward as in the first embodiment of the bobbin holder. As the first wheel 82 moves downward with the central body C' the uppermost lug 85' strikes the camming surface 95 of the lower cam member 92. The camming surface 95 causes further counterclockwise rotation of the first wheel 82 as shown in FIG. 17 with the result that the first wheel 82 is now rotated approximately forty-five degrees from its initial position at which it was preventing the downward motion of the central body C'. With the first wheel 82 in this rotated position, the distance between lugs 85 perpendicular to the centerline of the outer shell S' is the distance between adjacent lugs 85 rather than the distance between lugs 85 on opposite sides of the first wheel 82. This second distance between adjacent lugs 85 is less than the first distance between opposite lugs 85 and the vertical ribs 86 and 87 are sufficiently far apart to permit the first wheel 82 to pass between vertical ribs 86 and 87 with the first wheel 82 rotatably positioned in this manner. Thus, the central body C' is free to move downward and the pawls 51 and 52 are extended outwardly by the downward motion of the central body C' to hold the new bobbin B on the bobbin holder.

Figure 21:
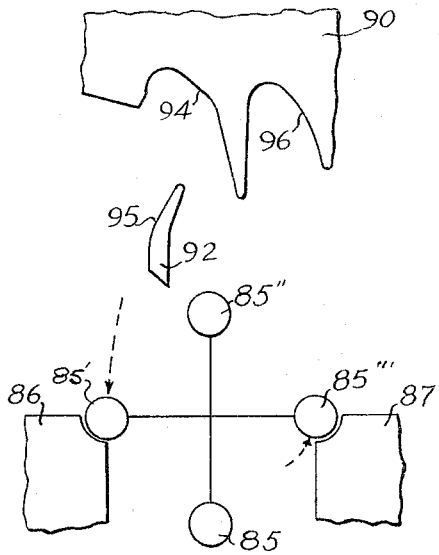
FIG. 21 is a schematic presentation of the operating means of the second embodiment of the bobbin holder and shows the position of a positioning wheel after secondary holding rotation and with the central body held upward and the pawls retracted into the outer shell.
Figure 20:
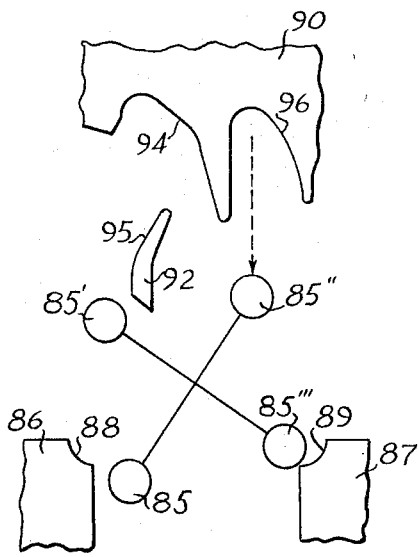
FIG. 20 is a schematic presentation of the operating means of the second embodiment of the bobbin holder and shows the position of a positioning wheel as the central body moves downward after a primary holding rotation.

When it is subsequently desired to remove the bobbin B from the bobbin holder, the bobbin B is moved upward along the outer shell S' until the upward motion of the bobbin B and the sleeve R is limited by the central body C'. The resulting upward motion of the central body C' causes the lug 85" to engage the camming surface 96 of the upper cam member 90. The camming surface 96 causes counterclockwise rotation of the first wheel 82 and checks the upward motion of the wheel 82 and of the central body C'. The result of this rotation is that a lug 85''' is moved into a position in which it will engage the recess 89 of the second vertical rib 87 when the wheel 82 subsequently moves downward. Thus, after upward motion of the bobbin B to remove the bobbin B from the bobbin holder, the downward motion of the central body C' as the bobbin B is moved downward along the outer shell S' causes the lug 85''' to engage the recess 89 and this causes the wheel 82 to rotate in a counterclockwise direction as shown in FIG. 21 so that the lug 85''' and a lug 85' on the opposite side of the wheel 82 from the lug 85''' are seated in the recesses 88 and 89 of the vertical ribs 86 and 87. This checks the downward motion of the central body C' with the pawls 51 and 52 still retracted within the outer shell S' and as a result the bobbin B may be easily removed from the bobbin holder and a new bobbin B placed upon the bobbin holder with an upward motion which will cause the operation of this embodiment of the bobbin holder described above to be repeated.

It will now be understood that in the second embodiment of the bobbin holder, a bobbin B is moved relative to the outer shell S' of the bobbin holder upward until its motion is stopped by the sleeve R regardless of whether the bobbin B is being positioned on or removed from the bobbin holder. When the bobbin B is being positioned on the bobbin holder, the upward motion causes the upper cam member 90 to provide primary releasing rotation to the wheel 82 and the lower cam member 92 to provide secondary releasing rotation to the wheel 82 so that the wheel 82 will pass between the vertical ribs 86 and 87. Similarly, the upward motion of the bobbin B when the bobbin B is being removed from the bobbin holder causes the upper cam member 90 to provide a primary holding rotation to the first wheel 82 and the second vertical rib 87 to provide a secondary holding rotation to the first wheel 82 with the result that the first wheel 82 engages the recesses 88 and 89 in the vertical ribs 86 and 87 and checks the downward motion of the central body C' at a position in which the pawls 51 and 52 are retracted. This permits easy removal of the bobbin B and positioning of a new bobbin B on the bobbin holder. Whether the bobbin B is being positioned on or removed from the bobbin holder, the required motion of the bobbin B relative to the outer shell S' is always upward until the motion of the bobbin B is stopped by the sleeve R which is in turn stopped by the operating means. Thus, the second embodiment of the bobbin holder, like the first embodiment of the bobbin holder described above, permits the same motion of a bobbin B with respect to the bobbin holder to be used to position the bobbin B on and remove the bobbin B from the bobbin holder.

*Third embodiment*

In the third embodiment of the bobbin holder shown in FIGS. 22 through 28, an upper plug 57" is integral with the central body C" and a hub shaft 58" extends upwardly above the upper plug 57". A collar 97 is rotatably positioned on the hub shaft 58" above the upper plug 57" by a plate 98 integral with the upper end of the hub shaft 58". The collar 97 is formed as a partial cylinder open on one side so as to allow it to be easily clipped into position on the hub shaft 58".

The collar 97 carries a right cam rod 99 and a left cam rod 100 extending in diametrically opposite directions from the circumference of the collar 97 with their center lines coinciding and perpendicular to the centerline of the central body C". When the central body C" is positioned within the cavity V of the outer shell S", the right cam rod 99 extends into a right camming channel 101 formed in the inner surface of the right half 44″ of the outer shell S″ and the left cam rod 100 extends into a left camming channel 102 formed in the inner surface of the left half 45″ of the outer shell S″. As with the previously described embodiments of the bobbin holder, the shaft 32″ extends through the right slot 30 in the right half 44″ of the outer shell S″ and through the left slot 31 in the left half 45″ of the outer shell S″ so that motion of the sleeve R along the outer shell S″ causes a corresponding motion of the central body C″ within the cavity V.

The camming channels 101 and 102 are substantially mirror images of each other so that they cause the cam rods 99 and 100 to move together as a single unit as the central body C″ moves upward and downward within the cavity V. Thus, only the motion of the right cam rod 99 in the right camming channel 101 will be described. However, the detailed constrution of both camming channels 101 and 102 will be understood from this description. The camming channel 101 forms an island member 103 which together with the outer edges of the camming channel 101 defines a path P1 in which the right cam rod 99 moves as a bobbin B moves upward along the outer shell S″ to be released from the bobbin holder, a path P2 in which the right cam rod 99 moves as a bobbin B moves downward along the outer shell S″ to be removed from the bobbin holder, a path P3 in which the right cam rod 99 moves as a new bobbin B is slid upward along the outer shell S″ for positioning on the bobbin holder, and a path P4 in which the right cam rod 99 moves as the bobbin B is released to slide downward along the outer shell S″ for positioning on the outer shell S″ by the pawls 51 and 52.

The path P1 is best seen in FIG. 25, and it will be seen that the island member 103 serves to impart an oscillatory rotational motion to the right cam rod 99 as the central body C″ moves upward. This motion or path P1 serves to permit the right cam rod 99 to move upward past the island member 103 into a position above the island member 103 where upward motion of the right cam rod 99 and of the central body C″ is checked by a finger 105 extending downwardly toward the island member 103. This serves to limit the upward motion of the sleeve R and the bobbin B along the outer shell S″ of the bobbin holder as the bobbin B is being moved upward for release from the bobbin holder.

When the bobbin B is subsequently moved downward for removal from the bobbin holder, the path P2 of the right cam rod 99 resulting from the downward motion of the central body C″ causes the right cam rod 99 to strike an upper guide surface 106 of the island 103. The right cam rod 99 slides downwardly along the upper guide surface 106 of the island member 103 with a rotational motion about the hub shaft 58″ until it reaches a holding surface 107 of the island 103 where the downward motion of the right cam rod 99 and the central body C″ is checked. This checking of the downward motion of the central body C″ causes the pawls 51 and 52 to remain retracted so that a used bobbin B is easily removed from the bobbin holder and a new bobbin B is easily positioned on the bobbin holder.

When a new bobbin B is positioned on the bobbin holder, it is slid upwardly along the outer shell S″ causing the sleeve R and the central body C″ to move upward as shown by a path P3 in FIG. 27. The path P3 of the right cam rod 99 carries the right cam rod 99 upward until it engages the sloping surface of the finger 105 which causes the right cam rod 99 to slide along the sloping surface of the finger 105 and rotate about the hub shaft 58″ until motion of the right cam rod 99 is checked by the wall 108 of the right camming channel 101 in a position at which the island 103 is no longer below the right cam rod 99. Thus, when the bobbin B is released and allowed to drop along the outer shell S″ after the foregoing described upward motion of the bobbin B along the outer shell S″, the right cam rod 99 drops along the path P4 as shown in FIG. 28 and passes beneath a lower extension 104 of the island 103 so as to permit the central body C″ to move downward and extend the pawls 51 and 52 to the extent permitted by the recess 25 in the bobbin B, thus holding the bobbin B in position on the bobbin holder.

It will be seen that the right camming channel 101 imparts a primary holding rotation as defined by path P1 and a secondary holding rotation as defined by the path P2 to the right cam rod 99. These holding rotations are in response to an upward and downward movement of the bobbin B along the outer shell S″ as the bobbin B is removed from the bobbin holder and the pawls 51 and 52 are retracted within the outer shell S″ to permit the easy removal of this bobbin and the easy positioning of a new bobbin on the bobbin holder. Similarly, it will be understood that the right camming channel 101 imparts a primary releasing motion as defined by the path P3 and a secondary releasing motion as defined by the path P4 to the right cam rod 99. These releasing motions serve to release the central body C″ for downward motion so as to extend the pawls 51 and 52 into the recess 25 of a bobbin B and are responsive to an upward and downward motion of the bobbin B along the outer shell S″ substantially identical to the upward and downward motion of a bobbin B along the outer shell S″ required for the holding motions described above. It will also be understood that the secondary releasing motion as defined by the path P4 places the right cam rod 99 in position so that the next motion imparted to the right cam rod 99 must be the primary holding motion as defined by the path P1. Thus, the specific embodiment of the invention shown in FIGS. 22 through 28 serves to alternately hold the pawls 51 and 52 in retracted position and to release the pawls 51 and 52 for outward extension in response to repeated upward and downward motions of a bobbin B relative to the outer shell S″.

*Operation*

From the foregoing description of three embodiments of the bobbin holder disclosed herein, it will be understood that the operating means of the bobbin holder is responsive to the upward motion of a bobbin B along the outer shell S and that the operating means will alternately cause the pawls 51 and 52 to be retracted within the outer shell S and to be extended outwardly from the outer shell S in respond to this upward motion of a bobbin B. Thus, the operation of the bobbin holder simply requires that a bobbin B be slid upwardly along the outer shell S until checked and then released. Whether the bobbin is to be removed from the bobbin holder or positioned on the bobbin holder, the bobbin B is always slid upward along the outer shell S until its upward motion is checked by the sleeve R and released. The result is that bobbins B are positioned on or removed from the bobbin holder by a single efficient pattern of motion.

Moreover, it will be understood that when a bobbin B is positioned on the bobbin holder by an upward motion of the bobbin B along the outer shell S of the bobbin holder, the pawls 51 and 52 extend outwardly from the outer shell S until they engage the walls of the recess 25 in the bobbin B and that regardless of the extent to which the pawls 51 and 52 are extended, the bobbin B is firmly positioned on the bobbin holder. This is because the pawls 51 and 52 are extended by the downward motion of the central body C and because the pawls 51 and 52 will move inwardly only if the central body C is moved upward within the cavity V. Thus, until the central body C is subsequently raised at the time the bobbin B is removed from the bobbin holder, the pawls 51 and 52 remain in position to firmly hold the bobbin B in position.

It will be obvious that many variations may be made in the embodiment here chosen for the purpose of illustrating the present invention without departing from the scope thereof as defined by the appended claims.

What is claimed is:

1. A bobbin holder comprising a tubular member having an outwardly extending channel therein, a central body slidably movable within the tubular member and having a plurality of predetermined positions, a bobbin holding member pivotally mounted upon the central body so as to be retracted inwardly when the central body is in one of said predetermined positions, a slidable member movable along the tubular member and having a cycle of motion toward and away from a reference point on the tubular member, and means responsive to the motion of the slidable member for alternately retaining the central body in the said one predetermined position and releasing the central body from the said one predetermined position when the said cycle of motion of the slidable member is repeated a plurality of times.

2. A bobbin holder comprising a tubular member having an outwardly extending channel therein, a central body slidably movable within the tubular member and having a plurality of predetermined positions, a bobbin holding member pivotally mounted upon the central body so as to be retracted inwardly when the central body is in one of said predetermined positions and so as to be extended outwardly by the said channel in response to the position of the central body relative to the said predetermined position, a slidable member movable along the tubular member and having a cycle of motion toward and away from a reference point on the tubular member, and means responsive to the motion of the slidable member for alternately retaining the central body in the said one predetermined position and releasing the central body from the said one predetermined position when the said cycle of motion of the slidable member is repeated a plurality of times.

3. A bobbin holder comprising a tubular member having an outwardly extending channel therein, a central body slidably movable within the tubular member and having a plurality of predetermined positions, a bobbin holding member pivotally mounted upon the central body so as to be retracted inwardly when the central body is in one of said predetermined positions and so as to be extended outwardly by the said channel to varying degrees dependent upon the position of the central body relative to the said predetermined position, a slidable member movable along the tubular member and having a cycle of motion toward and away from a reference point on the tubular member, and means responsive to the motion of the slidable member for alternately retaining the central body in the said one predetermined position and releasing the central body from the said one predetermined position when the said cycle of motion of the slidable member is repeated a plurality of times.

4. A bobbin holder comprising a tubular member having an outwardly extending channel therein, a central body slidably movable within the tubular member relative to a first position and a second longitudinal position, a bobbin holding member pivotally mounted upon the central body so as to be inwardly retracted when the central body is in the said first position and so as to be outwardly extended by the said channel when the central body is in the said second longitudinal position, a slidable member movable along the tubular member and having a cycle of motion toward and away from a reference point on the tubular member, and means responsive to the motion of the slidable member for alternately retaining the central body in the said first longitudinal position and releasing the central body from the said first longitudinal position for movement toward the second position when the said cycle of motion of the slidable member is repeated a plurality of times.

5. A holder for a bobbin comprising a tubular member, a central body slidably movable within the tubular member relative to a predetermined position, a bobbin holding member pivotally mounted upon the central body and having an inward position when the central body is in the said predetermined position and a plurality of outwardly extending bobbin holding positions, means for alternately retaining the central body in the said predetermined position and releasing the central body from the said predetermined position in response to a repeated motion of the bobbin relative to the tubular member.

6. A holder for a bobbin, said holder comprising a tubular member, a central body slidably movable within the tubular member relative to a predetermined position, a bobbin holding member pivotally mounted upon the central body and having an inward position when the central body is in the said predetermined position and a plurality of outwardly extending bobbin holding positions when the body is released from the predetermined position, means responsive to a particular motion of the bobbin relative to the tubular member for retaining the central body in the said predetermined position, and means responsive to the said particular motion of the bobbin relative to the tubular member for releasing the central body from the said predetermined position.

7. A bobbin holder for alternately holding a bobbin in response to a particular upward motion of the bobbin relative to the bobbin holder and releasing the bobbin in response to the particular upward motion of the bobbin relative to the bobbin holder, said bobbin holder comprising a tubular member having an outwardly extending channel therein, a body slidably movable within said tubular member and having a predetermined position, a bobbin holding member pivotally mounted upon said body so as to be retracted inwardly when the said body is in the said predetermined position and so as to be extended outwardly by the said channel to varying extent as the said body moves downward from the said predetermined position, and means responsive to the said particular motion of the bobbin for alternately retaining the said body in the said predetermined position and releasing the said body for downward motion from the said predetermined position.

8. A holder for a bobbin comprising a tubular member; a central body slidably movable within the tubular member in response to motion of the bobbin relative to the tubular member; a bobbin holding member operatively connected to the central body so as to extend outwardly of the tubular member to a bobbin holding position as the central body moves downward within the tubular member; positioning means for positioning the central body within said tubular member, said positioning means having a first position in which it stops upward motion of the central body within the tubular member, a second position in which it stops downward motion of the central body within the tubular member, a third position in which it stops upward motion of the central body within the tubular member, and a fourth position in which it does not restrict downward motion of the central body within the tubular member; a first rotating means responsive to upward motion of the central body within the tubular member for alternately rotating the positioning means from its second position to its third position and from its fourth position to its first position; and a second rotating means responsive to downward motion of the central body within the tubular member for alternately rotating the positioning means from its first position to its second position and from its third position to its fourth position.

9. A holder for a bobbin comprising a tubular member; a central body slidably movable within the tubular member in response to motion of the bobbin relative to the tubular member; a bobbin holding member operatively connected to the central body so as to extend outwardly of the tubular member to a plurality of bobbin holding positions as the central body moves downward within the tubular member; positioning means for positioning the central body within the tubular member, said positioning means being rotatable and having a first position in which it stops downward motion of the central body within the tubular member, and a second position in which it does not restrict downward motion of the central body within the tubular member; and rotating means responsive to upward motion of the central body within the tubular member for alternately rotating the positioning means from its first position to its second position and from its second position to its first position.

10. A holder for a bobbin comprising a tubular member; a central body slidably movable to and from a particular position within the tubular member in response to motion of the bobbin relative to the tubular member; a bobbin holding member operatively connected to the central body, said bobbin holding member extending outwardly of the tubular member to a plurality of bobbin holding positions as the central body moves downward from the said particular position; positioning means for positioning the central body within the tubular member, said positioning means having a first position in which it stops upward motion of the central body within the tubular member, a second position in which it stops downward motion of the central body within the tubular member at the said particular position, a third position in which it stops upward motion of the central body within the tubular member, and a fourth position in which it does not restrict downward motion of the central body within the tubular member; a first rotating means responsive to upward motion of the central body within the tubular member for alternately rotating the positioning means from its second position to its third position and from its fourth position to its first position; and a second rotating means responsive to downward motion of the central body within the tubular member for alternately rotating the positioning means from its first position to its second position and from its third position to its fourth position.

11. A holder for a bobbin comprising a tubular member; a central body slidably movable upwardly and downwardly within the tubular member in response to motion of the bobbin relative to the tubular member; a bobbin holding member operatively connected to the central body, said bobbin holding member being inwardly of the tubular member when the central body is moved upward to a particular position within the tubular member and extending outwardly of the tubular member to a plurality of bobbin holding positions as the central body moves downward from the said particular position; positioning means for positioning the central body within the tubular member, said positioning means being rotatable and having a first position in which it stops upward motion of the central body within the tubular member at a vertical position above the said particular position, a second position in which it stops downward motion of the central body within the tubular member at the said particular position, a third position in which it stops upward motion of the central body within the tubular member at substantially the same vertical position within the tubular member as upward motion of the central body is stopped by its first position, and a fourth position in which it does not restrict downward motion of the central body within the tubular member; a first rotating means responsive to upward motion of the central body within the tubular member for alternately rotating the positioning means from its second position to its third position and from its fourth position to its first position; and a second rotating means responsive to downward motion of the central body within the tubular member for alternately rotating the positioning means from its first position to its second position and from its third position to its fourth position.

12. A holder for a bobbin comprising a tubular member; a central body slidably movable within the tubular member in response to motion of the bobbin relative to the bobbin holder; a bobbin holding member operably connected to the central body, said bobbin holding member being retracted into the tubular member when the central body is in an upward position within the tubular member and having a plurality of outwardly extending bobbin holding positions as the central body moves downward within the tubular member; a positioning rod rotatable attached to the upper end of the central body within the tubular member; check means for rotating said positioning rod from a first position to a second position as the positioning rod moves downward within the tubular member and for checking the downward motion of the positioning rod when it is in the second position; adjusting means for rotating the positioning rod from a third position to a fourth position allowing the positioning rod to move downward without restriction within the said tubular member; and rotating means for alternately rotating the positioning rod from its fourth position to its first position and from its second position to its third position in response to upward motion of the central body within the tubular member.

13. A holder for a bobbin comprising a tubular member; a central body slidably movable within the tubular member; a bobbin holding member operably connected to the central body and having an outwardly extending bobbin holding position as the central body moves downward within the tubular member; a positioning rod rotatably attached to the upper end of the central body within the tubular member; guide means for rotating said positioning rod from a first position to a second position as the positioning rod moves downward within the tubular member; adjusting means for rotating the positioning rod from a third position to a fourth position as the positioning rod moves downward within the said tubular member; holding means for stopping downward motion of the positioning rod when the positioning rod is in its second position; and rotating means for alternately rotating the positioning rod from its fourth position to its first position and from its second position to its third position in response to upward motion of the central body within the tubular member.

14. A holder for a bobbin comprising a tubular member; a central body slidably movable within the tubular member in response to motion of a bobbin relative to the bobbin holder; a bobbin holding member operably connected to the central body, said bobbin holding member being retracted into the tubular member when the central body is in an upward position within the tubular member and having a plurality of outwardly extending bobbin holding positions as the central body moves downward within the tubular member; a wheel rotatably mounted at the upper end of the central body; rib means for rotating the wheel from a first position to a second position as the wheel moves downward within the tubular member and for stopping the downward motion of the wheel when it is in the said second position; a first cam means for rotating the wheel from a third position to a fourth position as the wheel moves downward without restriction within the tubular member; and a second cam means for alternately rotating the wheel from its fourth position to its first position and from its second position to its third position in response to upward motion of the central body within the tubular member.

15. A holder for a bobbin comprising a tubular member; a central body slidably movable within the tubular member in response to motion of a bobbin relative to the bobbin holder; a bobbin holding member operably connected to the central body and having an outwardly extending bobbin holding position as the central body moves downward within the tubular member; a wheel rotatably mounted at the upper end of the central body; stop means for rotating the wheel from a first position to a second position as the wheel moves downward within the tubular member and for stopping the downward motion of the wheel when it is in the said second position; a first cam means for rotating the wheel from a third position to a fourth position as the wheel moves downward without restriction within the tubular member; and a second cam means for alternately rotating the wheel from its fourth position to its first position and from its second position to its third position in response to upward motion of the central body within the tubular member.

16. A holder for a bobbin comprising a tubular member; a central body slidably movable within the tubular member in response to motion of a bobbin relative to the bobbin holder; a bobbin holding member operably connected to the central body, said bobbin holding member being retracted into the tubular member when the central body is in an upward position within the tubular member and having a plurality of outwardly extending bobbin holding positions as the central body moves downward within the tubular member, a cam rod rotatably mounted at the upper end of the central body; a first camming means for rotating the cam rod from a first position to a second position as the cam rod moves downward within the tubular member and for stopping the downward motion of the cam rod when it is in the said second position; a second camming means for rotating the cam rod from a third position to a fourth position as the cam rod moves downward without restriction within the tubular member; and a third camming means for alternately rotating the cam rod from its fourth position to its first position and from its second position to its third position in response to upward motion of the central body within the tubular member.

17. A holder for a bobbin comprising a tubular member; a central body slidably movable within the tubular member in response to motion of a bobbin relative to the bobbin holder; a bobbin holding member operably connected to the central body and having an outwardly extending bobbin holding position as the central body moves downward within the tubular member, a cam rod rotatably mounted at the upper end of the central body; a first camming means for rotating the cam rod from a first position to a second position as the cam rod moves downward within the tubular member and for stopping the downward motion of the cam rod when it is in the said second position; a second camming means for rotating the cam rod from a third position to a fourth position as the wheel moves downward without restriction within the tubular member; and a third camming means for rotating the wheel from its fourth position to its first position and from its second position to its third position in response to upward motion of the central body within the tubular member.

18. A holder for a bobbin comprising a tubular member; a central body slidably movable within the tubular member in response to motion of a bobbin relative to the bobbin holder; a slidably mounted bobbin holding member operably connected to the central body and having an outwardly extending bobbin holding position as the central body moves downward within the tubular member; a cam rod rotatably mounted at the upper end of the central body; a first camming means for rotating the cam rod from a first position to a second position as the cam rod moves downward within the tubular member and for stopping the downward motion of the cam rod when it is in the said second position; and a second camming means for rotating the cam rod from the second position to the first position in response to two upward motions of the bobbin relative to the bobbin holder.

19. A holder for a bobbin comprising a tubular member; a central body slidably movable within the tubular member in response to motion of a bobbin relative to the bobbin holder; a bobbin holding member operably connected to the central body, said bobbin holding member being retracted into the tubular member when the central body is in an upward position within the tubular member and having a plurality of outwardly extending bobbin holding positions as the central body moves downward within the tubular member, a cam wheel rotatably mounted at the upper end of the central body; a first camming means for rotating the cam wheel from a first position to a second position as the cam wheel moves downward within the tubular member and for stopping the downward motion of the cam rod when it is in the said second position; a second camming means for rotating the cam wheel from the second position to the first position in response to two upward motions of the bobbin relative to the bobbin holder.

20. In a bobbin holder, a tubular member, a central body slidably movable within the tubular member, a bobbin holding member operatively connected to the central body and slidable therewith, a slidable member movable along the tubular member and having a single operating cycle of motion on the tubular member, and means responsive to the operating cycle of motion of the slidable member for alternately retaining the central body in a predetermined position within said tubular member and releasing the central body from the said predetermined position when the said operating cycle of motion of the slidable member is repeated.

21. In a bobbin holder, a tubular member, a central body slidably movable within the tubular member, a bobbin holding member operatively connected to the central body and slidable therewith so as to be retracted inwardly to bobbin-release position when the central body is in a predetermined position and so as to be extended outwardly by the said channel to bobbin-holding position in response to other positions of the central body relative to the said predetermined position, a slidable member movable along the tubular member, and means responsive to the same operating cycle of motion of the slidable member for alternately retaining the central body in the said predetermined position and releasing the central body from the said predetermined position when the said operating cycle of motion of the slidable member is repeated.

22. A bobbin holder comprising a tubular member, a central body slidably movable within the tubular member, a bobbin holding member operatively connected to the central body and slidable therewith and having an inward bobbin-release position and a plurality of different outwardly extending bobbin-holding positions, means for alternately retaining the central body in the said bobbin release position and freeing the central body from said bobbin release position in response to repetition of the same motion of the bobbin relative to the tubular member.

23. A bobbin holder comprising a tubular member having an outwardly extending channel therein defining an internal inclined camming surface, a central body slidably movable within the tubular member and having a predetermined position, a bobbin holding member operatively connected to the central body and engaging said camming surface so as to be retracted inwardly when the central body is in the said predetermined position, a slidable member movable along the tubular member and having a cycle of motion toward and away from a reference point on the tubular member, and means responsive to the motion of the slidable member for alternately retaining the central body in the said predetermined position and releasing the central body from the said predetermined position when the said cycle of motion of the slidable member is repeated a plurality of times.

24. A bobbin holder comprising a tubular member having an outwardly extending channel therein defining an internal inclined camming surface, a central body slidably movable within the tubular member and having a predetermined position, a bobbin holding member operatively connected to the central body and engaging said camming surface to be retracted inwardly when the central body is in the said predetermined position and so as to be extending outwardly by the said channel in response to a position of the central body other than the said predetermined position, a slidable member movable along the tubular member and having a cycle of motion toward and away from a reference point on the tubular member, and means responsive to the motion of the slidable member for alternately retaining the central body in the said predetermined position and releasing the central body from the said predetermined position when the said cycle of motion of the slidable member is repeated a plurality of times.

25. A bobbin holder comprising a tubular member having an outwardly extending channel therein defining an internal inclined camming surface, a central body slidably movable within the tubular member and having a predetermined position, a bobbin holding member operatively connected to the central body and engaging said camming surface so as to be retracted inwardly when the central body is in the said predetermined position and so as to be extended outwardly by the said channel to varying degrees dependent upon the position of the central body relative to the said predetermined position, a slidable member movable along the tubular member and having a cycle of motion toward and away from a reference point on the tubular member, and means responsive to the motion of the slidable member for alternately retaining the central body in the said predetermined position and releasing the central body from the said predetermined position when the said cycle of motion of the slidable member is repeated a plurality of times.

26. A bobbin holder comprising a tubular member having an outwardly extending channel therein defining an internal inclined camming surface, a central body slidably movable within the tubular member relative to a first position and a second position, a bobbin holding member operatively connected to the central body and engaging said camming surface so as to be inwardly retracted when the central body is in the said first position and so as to be outwardly extended by the said channel when the central body is in the said second position, a slidable member movable along the tubular member and having a cycle of motion toward and away from a reference point on the tubular member, and means responsive to the motion of the slidable member for alternately retaining the central body in the said first position and releasing the central body from the said first position for movement toward the second position when the said cycle of motion of the slidable member is repeated a plurality of times.

References Cited by the Examiner

UNITED STATES PATENTS 2,931,593   4/1960   Pray _____ 242—130.2

FRANK J. COHEN, *Primary Examiner.*

MERVIN STEIN, *Examiner.*

L. D. CHRISTIAN, *Assistant Examiner.*